May 15, 1956    T. F. KIERNAN, JR    2,745,180
DENTURE CONSTRUCTION

Filed July 1, 1953

INVENTOR.
Thomas F. Kiernan
BY
Nathaniel Frucht
ATTORNEY

United States Patent Office 2,745,180
Patented May 15, 1956

2,745,180

DENTURE CONSTRUCTION

Thomas F. Kiernan, Jr., Warwick, R. I.

Application July 1, 1953, Serial No. 365,491

6 Claims. (Cl. 32—10)

The present invention relates to dentistry and has particular reference to a novel construction for a denture.

The principal object of the invention is to provide a simple and effective arrangement for implanting artificial teeth.

Another object of the invention is to provide a denture which is permanently secured in the mouth.

A further object of the invention is to provide an implanted artificial tooth arrangement which anchors within the walls of the tooth sockets.

An additional object of the invention is to provide an implanted artificial tooth arrangement having a crown extending above the surface of the gum.

With the above and other objects and advantageous features in view, the invention consists of a novel arrangement of parts, more fully disclosed in the detailed description following, in conjunction with the accompanying drawings, and more specifically defined in the claims appended thereto.

It has been found advantageous to provide a permanent denture consisting of teeth which are individually implanted within the tooth sockets. To this end, I provide teeth having anchoring bases made of suitable material which are adapted to be permanently embedded within the jaw bones, and to which tooth crowns are removably attached, the parts being designed to set the crowns within the gum, whereby a natural appearance is given to the denture.

Figure 1:
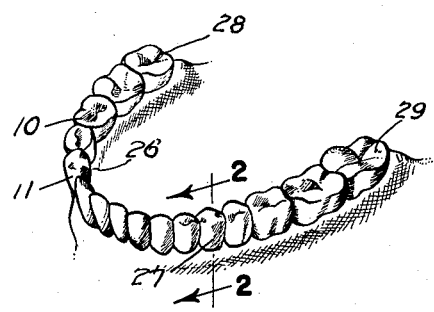
Fig. 1 is a perspective view of a lower jaw formation embodying the invention.
Figure 2:
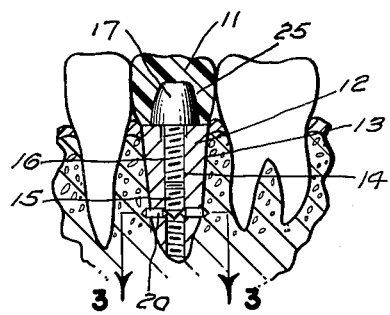
Fig. 2 is a circumferential vertical section on the line 2—2 of Fig. 1.

Referring to the drawings, Fig. 1 illustrates a set of lower jaw teeth 10, which includes implanted artificial teeth 11, embodying my invention. Each artificial tooth 11 includes an anchoring base 12 of suitable material, preferably stainless steel, generally conforming to the shape of the tooth cavity 13 in the jaw and having an internally threaded vertical bore 14 for threadedly receiving a thimble 15 and a screw element 16 from a depending head 17 adapted to seat on the base 12. The thimble 15 is tapered to a point at its lower end 18, and has a recess 19 at the opposite end shaped to be turned by an allen type wrench, whereby the thimble can be threaded downwardly into the vertical bore 14 to engage and spread transverse pins 20 which are slidably positioned within radially spaced horizontal bores 21.

Figure 3:
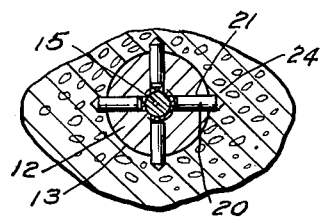
Fig. 3 is an enlarged section on the line 3—3 of Fig. 2.

The opposite ends of the pins taper to a point as illustrated at 22, 23 and normally extend beyond the length of the horizontal bores 21 whereby downward movement of the thimble forces the pins outwardly to penetrate into the walls 24 of the tooth socket 13, as illustrated in Fig. 3 to permanently implant the anchoring base 12 within the socket and below the gum.

The screw head 17 is shaped to seat within a socket recess 25 in the crown 26 of the tooth 11, and is adapted to extend into the gum whereby the tooth crown has its base level below the top level of the gum.

Figure 5:
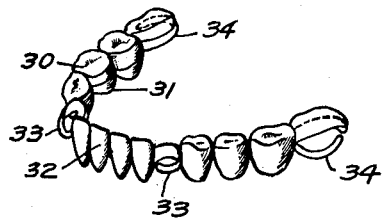
Fig. 5 is a perspective view of a denture set for detachable mounting on spaced artificial tooth supports.
Figure 4:
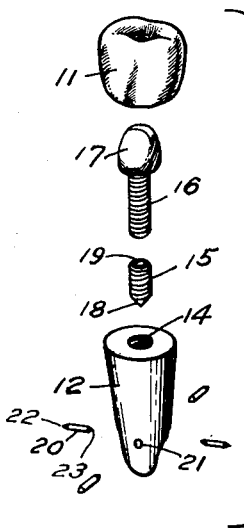
Fig. 4 is an exploded view of the artificial tooth of Fig. 2.

The implanted tooth construction heretofore described may be advantageously used as a support for a complete upper or lower denture, by implanting spaced artificial teeth which can then detachably receive the denture. Four spaced teeth, for example, such designated 26, 27, and molars designated 28, 29, will detachably support a carrier retainer 30, see Fig. 5, which has a metal holding frame 31, and with teeth 32, clasps 33 adapted to grip fit the teeth 26, 27 and clasps 34 adapted to grip the molars 28, 29.

It is now obvious that my construction provides a more naturally fitting denture which is permanent, comfortable and sanitary.

Although I have disclosed a specific constructional embodiment of my invention, it is obvious that any other known way of locking the anchoring base within the socket may be used, including means for relieving or removing the locking to permit withdrawal of the anchoring base, and that changes in the size, shape and arrangement of the parts may be made to meet certain other requirements, without departing from the spirit or the scope of the invention as defined in the appended claims.

I claim:

1. An artificial tooth comprising an anchoring base adapted to fit within a tooth socket, said anchoring base having an internally threaded vertical bore and horizontally spaced radial bores, a tooth crown having a socket recess, a screw element including a head and a threaded lower shank, said shank being threadedly positioned within said bore and said head being seated in said crown socket recess, and means including a threaded thimble within said vertical bore and slidably movable pins in said radial bores for securing said anchoring base within the tooth socket.

2. An artificial tooth for implanting in a natural tooth socket, comprising an anchoring base adapted to fit within the natural socket, a tooth crown, and means attaching said tooth crown to said anchoring base, including an element mounted in the crown and having a depending shank locked to the anchoring base, said anchoring base having outwardly extending elements movable to penetrate the walls of the tooth socket.

3. An artificial tooth for implanting in a natural tooth socket, comprising an anchoring base adapted to fit within the natural socket, a tooth crown having a socket recess, and means attaching said tooth crown to said anchoring base, including an element mounted in the crown and having a depending shank locked to the anchoring base within said socket recess, said anchoring base having outwardly extending elements movable to penetrate the walls of the tooth socket.

4. An artificial tooth for implanting in a natural tooth socket, comprising an anchoring base adapted to fit within the natural socket, a tooth crown, and means attaching said tooth crown to said anchoring base having an internally threaded vertical bore, including an element mounted in the crown and having a depending threaded shank threadedly locked to said bore positioned within said anchoring base and having outwardly extending elements movable to penetrate the walls of the tooth socket.

5. An artificial tooth comprising, in combination, an anchoring base adapted to fit within a natural tooth socket, said anchoring base having an internally threaded vertical bore and horizontally spaced bores, a tooth crown having a socket recess, a screw element including a head and a threaded lower shank, said shank being threadedly positioned within said bore and said head being mounted in said socket recess, a threaded thimble having a tapering lower portion within said vertical bore and positioned below said threaded lower shank, and slidably movable pins in said bores, said tapering lower thimble portion being adapted to contact said movable pins on downward movement of the thimble, whereby the pins are slidably forced outwardly for securing said anchoring base within the tooth socket.

6. An artificial tooth comprising, in combination, an anchoring base adapted to fit within a natural tooth socket, said anchoring base having an internally threaded vertical bore and horizontally spaced radial bores, a tooth crown having a socket recess, a screw element including a head and a threaded lower shank, said shank being threadedly positioned within said bore and said head being mounted in said socket recess, a threaded thimble having a tapering portion and a recess at its upper end within said vertical bore and positioned below said threaded lower shank, and slidably movable pins with tapered end portions in said radial bores, said tapering lower thimble portion being adapted to contact said movable pins on downward movement of the thimble, whereby the pins are slidably forced radially outwardly for securing said anchoring base within the tooth socket.

References Cited in the file of this patent

UNITED STATES PATENTS 711,324    Lacy _____ Oct. 14, 1902